Nov. 25, 1941.   J. H. SMITH   2,263,828
LAMINATED MATERIAL
Filed Oct. 26, 1938
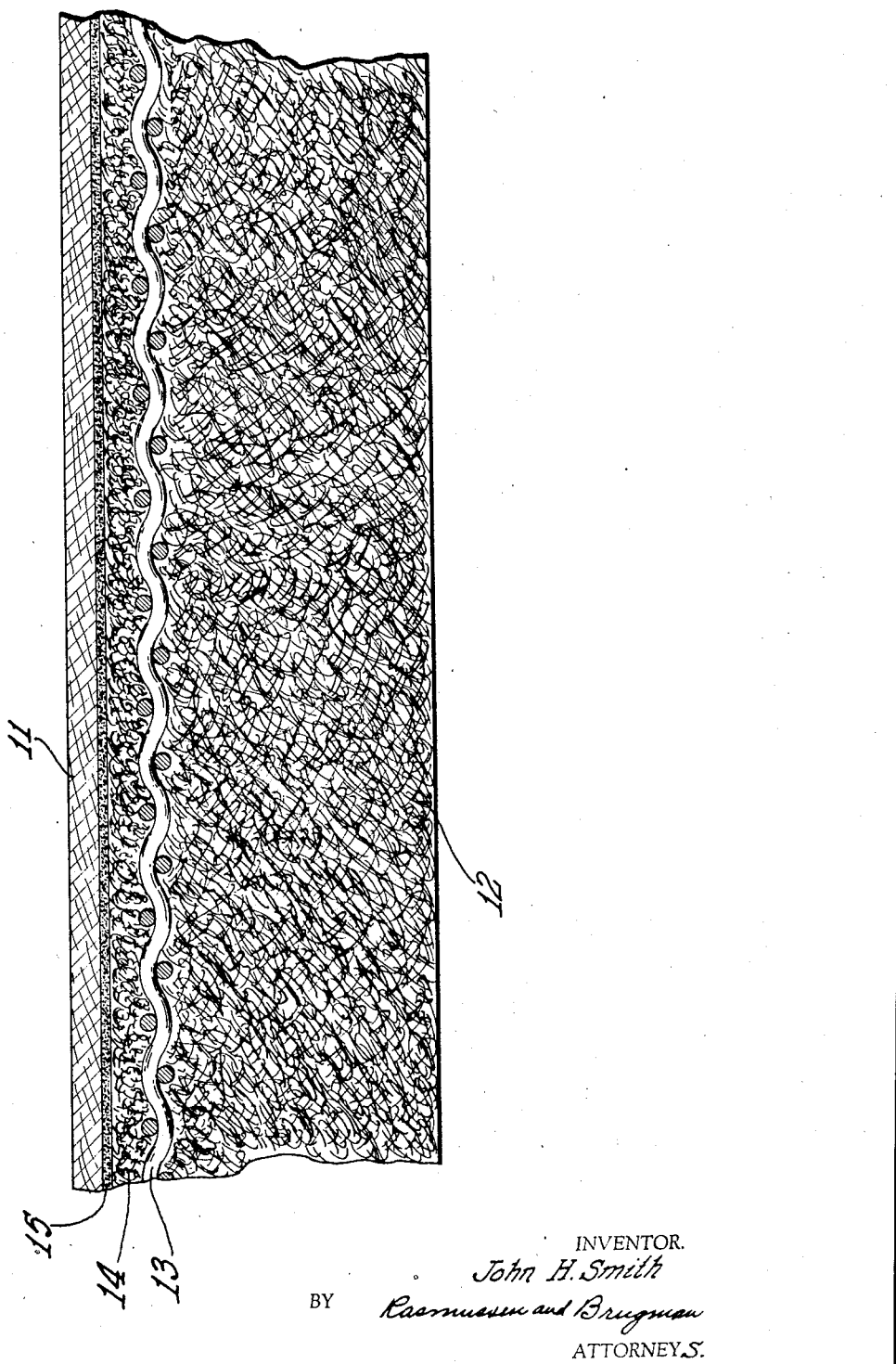
INVENTOR.
John H. Smith
BY Rasmussen and Brugman
ATTORNEYS.

Patented Nov. 25, 1941

2,263,828

UNITED STATES PATENT OFFICE 2,263,828

LAMINATED MATERIAL

John H. Smith, Chicago, Ill.

Application October 26, 1938, Serial No. 236,988

4 Claims. (Cl. 154—45.9)

This invention relates in general to laminated material, and more particularly to a decorative laminated material having improved moisture-resistance characteristics. The instant application is a continuation in part of my co-pending application Serial No. 101,419, filed September 18, 1936.

In the application of a laminated material, comprising thin wood veneer with a backing employed for its acoustical, insulative and fire-resistant characteristics, to a supporting surface, it has been found that the presence of moisture in any form causes not only warping, but surface creeping of the veneer. This detrimental effect of moisture upon the veneer has made it impractical to employ the latter in most instances, and especially where it is desired to use joints between adjacent portions of the veneer.

A principal object of this invention, therefore, is the provision of a laminated material comprising thin wood veneer having a backing of felted material and wire mesh which is so integrated as to be effectively resistant to the usual deleterious results of moisture applied thereto in any form.

A further object of the invention is the provision of such a laminated material which is extremely flexible, so that it may be applied to curved surfaces having very small radii by bending the material, either with or against the grain of the wood veneer, without breaking, splitting or cracking the latter.

Another important object of the invention is the provision of such a laminated material which is adapted to independently retain substantially any form to which it may be bent, although of a flexible character, and consequently to be adaptable for use in providing hollow, otherwise unsupported, columns, or the like.

A further object of the invention is the provision of such a laminated material which will have good sound deadening properties because the intermediate layer of felted material forms a cushion for the wire mesh backing and absorbs sound vibrations transmitted through either the veneer facing or the backing.

Numerous other objects and advantages of the invention will be apparent as it is better understood from the following description, which, when taken in connection with the accompanying drawing, discloses a preferred embodiment thereof.

The accompanying drawing is a magnified sectional view of an article of manufacture embodying the features of the instant invention.

Referring more particularly to the drawing, reference numeral 11 indicates a strip of thin, flexible wood veneer. This veneer may be cut from any desired wood, preferably to a thickness of from $\frac{1}{28}$ to $\frac{1}{100}$ of an inch. If desired, this veneer may be treated initially in such manner that it may be bent at a sharp angle either with or against the grain of the wood without splitting, cracking or breaking.

Reference numeral 12 indicates the main body portion of a sheet of felted material. A section of wire mesh 13 of any suitable construction is placed upon one surface of the felted material 12. A portion of the felted material 12 is then punched through the wire mesh 13 at spaced intervals, and the portion 14 thus punched through the wire mesh is ironed out in any suitable manner to present a smooth surface.

The next step in the making of the final laminated articles is to glue the exposed surface of the portion 14 of the felted material to the thin strip of wood veneer 11, as at 15. In glueing the felted material upon the veneer, either a "wet glue" or a "dry glue" process might be employed, but in order to attain the desired results of the present invention, it is necessary to use the latter. In this step, phenolic resin glue in sheet or powdered resin form, and of well-known composition, is disposed upon the exposed surface of the portion 14 of the felted material, and the veneer 11 is then applied to this glued surface and the product subjected to hydraulic pressure. In this glueing operation, the phenolic resin glue permeates well into the grain of the veneer 11, and thus acts as a barrier for any moisture passing through the felted material 12 to prevent its reaching the rear surface of the veneer 11.

It will be appreciated that the ironing of the punched out portion 14 of the felted material 12 is necessary to present a smooth surface to the wood veneer 11. If the punched out portion of the felted material were not thus smoothed out, glueing thereof onto the veneer would result in undulations or waves in the veneer. This punched out portion of the felted material on the veneer side of the wire mesh forms a spring-like cushion that provides resiliency and resistance to abrasion qualities and tends to sound dampen air borne vibrations from the surface or veneer side. The felted material backing tends to dampen noise vibrations from the rear side of the laminae. Hair felt is used in preference to other types of felt, because of its resistance to moisture, that is, while moisture may penetrate the hair felt, it creates no activity in the felt, such as causing expansion thereof. Jute, wool or other types of felt, on the other hand, become physically active under moisture conditions.

The reason for employing the above-described "dry glue" process in integrating the felted material and wood veneer is to prevent any moisture from reaching the wood veneer through the felted material when the finished product is subsequently applied to any desired backing surface. In the latter step, which might constitute the application of the laminated material herein disclosed to the wall of a room, for example, it is usually necessary to employ a wet glue, as the laminated article will have to be manually applied to such a surface without the use of excessive pressures. Consequently, such application of the laminated material to a supporting surface would normally result in the rear surface of the wood veneer 11 coming into contact with moisture. Moisture in any form thus applied to the laminated material would result in surface movement or creeping of the veneer 11 relative to the wire mesh, felted material laminae. Such surface movement of the wood veneer 11 would prevent the use of a similar laminated material in any application where it is desired to employ joining of adjacent strips or sections of the material. Even if this movement of the face veneer is not entirely eliminated by the above-described use of phenolic resin glue, the strength of the wire mesh in the laminae will resist and overcome any movement or activity in the face veneer. This is particularly true because, of course, the wire mesh is in itself non-susceptible to water activity.

In order to further obviate any surface movement of the veneer after application of the final product to a supporting surface, a treatment may be employed in which a suitable liquid phenolic resin impregnant is sprayed upon both surfaces of the veneer before glueing to the wire mesh, felted material laminae. This will effectively prevent moisture from attacking the veneer from the exterior of the laminated article, and sets up a water barrier to prevent water penetration of the wood veneer at any time before, during, or after the pressing process.

The above-described laminated material also may be integrated in a slightly different manner, as follows. Instead of punching portions of the hair felt through the wire mesh, the wire mesh may be placed upon the surface of the strip of hair felt, or other felted material employed, and subjected to pressure in any suitable manner. As a result of such pressure, the hair felt will be compressed to approximately one-half its original thickness, and the wire mesh will become embedded or enmeshed therein. The veneer may then be glued to the surface of the protruding portion of the felted material in the same manner as hereinbefore described, the protruding portion of the felted material corresponding to, and functioning in the same manner as, the punched out portion 14.

It is also possible, if desired, to glue the felted material to the wire mesh, and to glue the wire mesh directly to the wood veneer. If the $\frac{1}{28}''$ veneer is used, this method of integrating the laminae is entirely satisfactory, but with the extremely thin veneers of $\frac{1}{100}''$ in thickness, the glueing thereof directly to the wire mesh will result in corrugations or malformations of the outer veneer surface of the laminated material.

The resulting product will have a sufficiently high degree of flexibility, due to the inherent flexibility of the veneer, the glue or binder, the wire mesh and the felted material, to permit of its being applied to curved surfaces having very small radii by bending the material either with or against the grain of the wood veneer without any resulting breaking, splitting, or cracking thereof. At the same time, the wire mesh 13 results in the laminated material retaining substantially any form to which it may be bent. Consequently, the instant material is adapted for use in providing hollow and otherwise unsupported columns, or the like.

It will be readily understood that the relative dimensions of the main portion 12 and punched through portion 14 of the felted material may be varied as desired to meet any necessary requirements. For example, the thicker the felted material backing the better the sound proofing and insulating qualities of the laminated material, although the preferred thickness of the latter is approximately $\frac{1}{4}$ inch. It will be appreciated that the laminated material herein disclosed has very important acoustical, insulative and fire-resistant characteristics. If desired, the main portion 12 of the felted material also may be subsequently treated so as to be termite and vermin proof.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. An article of manufacture, comprising a backing of wire mesh with felted material secured thereto by having portions thereof extending through said wire mesh, and a thin strip of wood veneer secured to the outer surface of the portions of said felted material extending through said wire mesh.

2. An article of manufacture, comprising a backing of wire mesh with felted material which is unaffected by moisture secured thereto by having portions thereof extending through said wire mesh, and a thin strip of wood veneer secured to the outer surface of the portions of said felted material extending through said wire mesh by a moisture resistant adhesive.

3. As a new article of manufacture, the combination of a thin strip of wood veneer with a flexible backing, comprising wire mesh, and hair felt secured to said wire mesh by having portions thereof extending through the wire mesh, the portions of the hair felt extending through said wire mesh being secured to the strip of wood veneer by phenolic resin glue.

4. A laminated article of manufacture, comprising a lamina of felted material, an intermediate strengthening lamina of perforable material which is passive to moisture, said laminae being integrated together by having portions of said felted material extending through said perforable material, and a thin lamina of wood veneer integrated with said first laminae by being adhered to the portions of said felted material extending through said intermediate strengthening lamina.

JOHN H. SMITH.